(12) United States Patent
Lee et al.

(10) Patent No.: US 8,265,708 B2
(45) Date of Patent: Sep. 11, 2012

(54) OUTGOING TELEPHONE CALL INDICATION

(75) Inventors: Michael M. Lee, San Jose, CA (US); Chad G. Seguin, Morgan Hill, CA (US); Cyril Labidi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1073 days.

(21) Appl. No.: 12/185,606

(22) Filed: Aug. 4, 2008

(65) Prior Publication Data
US 2010/0029342 A1 Feb. 4, 2010

(51) Int. Cl.
*H04M 1/00* (2006.01)
(52) U.S. Cl. ............. 455/567; 455/466; 455/550.1; 340/407.1
(58) Field of Classification Search .......... 455/567, 455/466, 550.1, 412.1, 414.1, 557, 67.6, 455/156.1, 157.2; 379/52; 340/407.1, 407.2, 340/825.76
See application file for complete search history.

(56) References Cited

U.S. PATENT DOCUMENTS

| | | | |
|---|---|---|---|
| 6,963,762 B2 * | 11/2005 | Kaaresoja et al. | 455/567 |
| 7,881,750 B2 * | 2/2011 | Suonpera et al. | 455/557 |
| 2002/0177471 A1 * | 11/2002 | Kaaresoja et al. | 455/567 |
| 2004/0203530 A1 * | 10/2004 | Liang et al. | 455/90.3 |
| 2005/0064912 A1 * | 3/2005 | Yang et al. | 455/567 |
| 2005/0208903 A1 * | 9/2005 | Sakamoto | 455/90.3 |
| 2005/0287961 A1 * | 12/2005 | Chiou | 455/90.3 |
| 2006/0073856 A1 * | 4/2006 | Lundberg | 455/567 |
| 2006/0203802 A1 * | 9/2006 | Chou et al. | 370/352 |
| 2008/0153554 A1 * | 6/2008 | Yoon et al. | 455/567 |
| 2008/0254773 A1 | 10/2008 | Lee | |
| 2008/0254774 A1 | 10/2008 | Lee | |

\* cited by examiner

*Primary Examiner* — Minh D Dao
(74) *Attorney, Agent, or Firm* — Meyertons, Hood, Kivlin, Kowert & Goetzel, P.C.

(57) ABSTRACT

A mobile phone has a mobile phone housing in which are integrated an actuator and a telephone module. The actuator can vibrate the housing to give a haptic or tactile alert to the user. The actuator is to vibrate in accordance with an input signal. The telephone module activates the input signal during the making of an outgoing call to a destination phone, so that the housing vibrates to alert the user while the destination phone is ringing. In another embodiment, the telephone module signals a display screen integrated in the housing, to show a graphic indicative of the outgoing call. In addition, the telephone module activates the input signal for the backlight of the display screen during the making of the outgoing call, so that the backlight flashes the display screen while the destination phone is ringing. Other embodiments are also described and claimed.

9 Claims, 6 Drawing Sheets

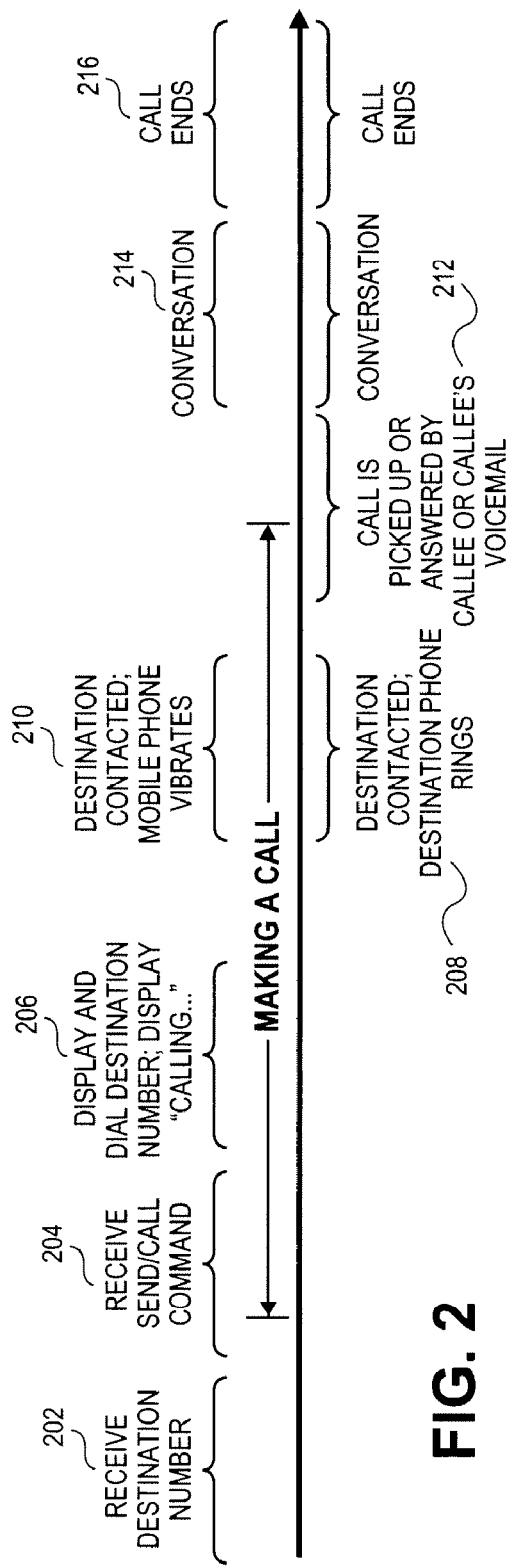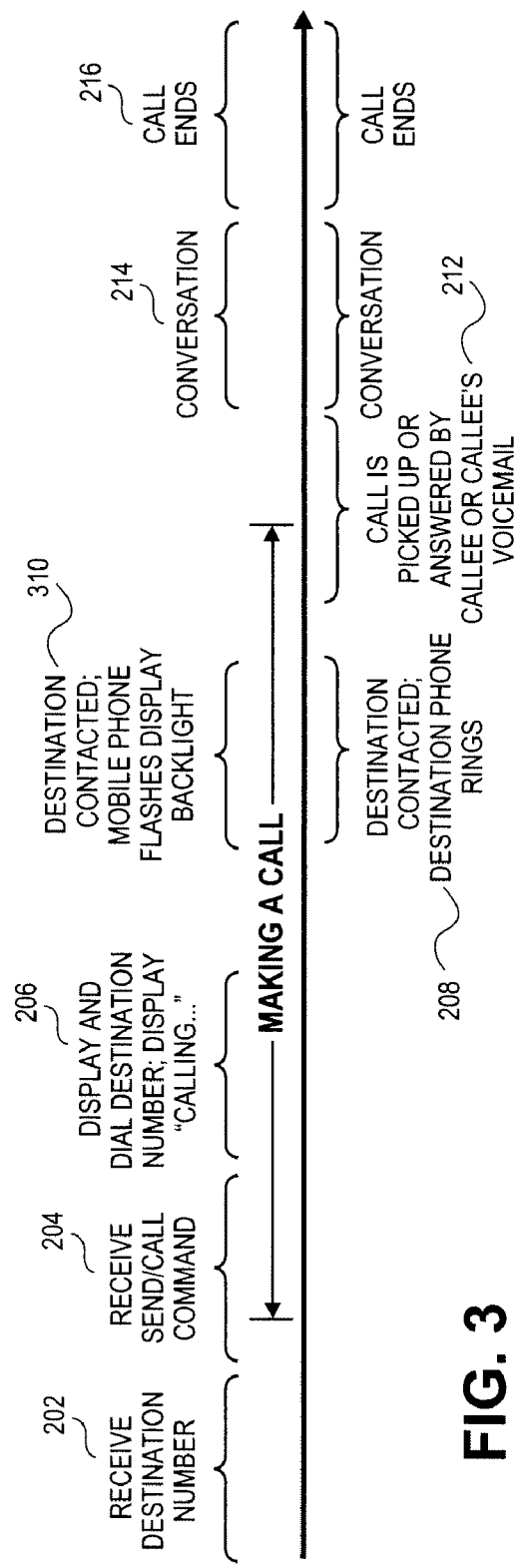

OUTGOING TELEPHONE CALL INDICATION

FIELD

An embodiment of the invention relates to how a mobile phone interacts with its user when the user is making an outgoing telephone call. Other embodiments are also described.

BACKGROUND

Consider a typical wireless phone call being made from a cellular communications network handset or a mobile multi-function device having wireless telephony capability (collectively referred to here as a "mobile device" or a "mobile phone"). Once the caller has entered or selected the number to be dialed by her phone (the called party or callee number) and has pressed the talk or send key, the phone provides the caller with a visual indication that the number is being dialed. For example, the text "dialing" or "calling" together with the dialed number and a blinking graphic, might be displayed by the mobile phone. This may be accompanied with, or preceded by, the sound or display of a sequence of dial tones, which correspond to the digits of the phone number being dialed. The content being displayed remains unchanged, even once a telephony switch associated with the callee's phone has been contacted and a ring tone starts to play (through the caller's receiver or speakerphone). The caller by now has positioned the phone, and in particular its receiver, next to her ear.

Next, when the call is answered (either by the called party himself or by a voicemail system), the caller's phone stops playing the ring tone and removes the displayed dialing or calling indication. At this point, i.e. when the phone stops ringing and the call is "picked up", the making of the call is complete. The caller's phone may then start and display a timer, which informs the caller of the duration of the call conversation.

Sometimes, the caller may not wish to leave a voicemail message and will simply hang up, upon hearing the ring tone stop and then the called party's outgoing message starting to play. To hang up, the caller typically moves the phone back, from next to his ear to a position in front of him, so that he can see the phone's keypad. The caller then actuates the "end" key to hang up and end the call.

SUMMARY

An embodiment of the invention is directed to a mobile phone that, during the making of an outgoing call, vibrates in a pulsing manner while the destination phone is ringing. The on/off cycle of the vibration pulse may be synchronized to that of the ring tone, which is being played back simultaneously through the receiver.

In another embodiment, the mobile phone flashes its display screen (e.g., its backlight), in sync with the ring tone (during the making of the outgoing call). Once the call has been answered, the background of the display may change color. The phone may be programmable by its end user, to enable just one or both of these vibratory and flashing screen indications. This may give the caller a more satisfying feeling when making outgoing phone calls. For example, the caller no longer needs to hold the phone against her ear or strain her eyes to read text on the display screen, to know that her outgoing call is being made.

In yet another embodiment, the mobile phone receives a signal, which indicates that the outgoing call just made is now being routed to the callee's voicemail. This voicemail signal precedes the playing of the callee's outgoing message and a voicemail tone after which the recording of a message begins. In response to detecting this signal, the phone displays a graphic and/or text and/or an audible alert (e.g., "being routed to voicemail"), which can be seen or heard by the caller when the phone is not up against her ear. This alerts the caller to the fact that the call she has just made has been routed to voicemail. The caller upon seeing or hearing this alert may decide to hang up, without leaving a message. Alternatively, the phone may be programmed by its user to automatically hang up whenever a voicemail signal is received (when an outgoing phone call has been routed to voicemail), perhaps because the user does not wish to ever leave a voicemail message. In another embodiment, the phone could be programmed to automatically enable its speakerphone, after alerting the caller that she has been routed to voicemail.

In another embodiment, the user could program her phone to automatically respond to the voicemail signal, by waiting for the voicemail tone (or other indication that message recording has begun), and then playing a previously recorded standard message or custom message from the caller. For example, after the callee's outgoing message has finished playing and the caller's phone detects a start recording tone, the phone may play a short, prerecorded sound clip such as "Hi, this is Michael Lee" and then hangs up. As an alternative to playing the pre-recorded message and hanging up, the phone could be programmed to enable its speakerphone in response to detecting the voicemail signal (and perhaps verifying first that the phone is not being held against the user's ear), so that the caller can hear the callee's outgoing message and then if desired leave a voice message.

The mobile phone may be configured or programmed by its user, to support one or more of the above-described outgoing call features.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 2 is a timeline of events that occur while processing a phone call, where the mobile phone vibrates during the making of the outgoing call.

FIG. 3 is a timeline of events for processing a phone call, where the mobile phone flashes its display screen backlight during the making of the outgoing call.

DETAILED DESCRIPTION

Figure 1:
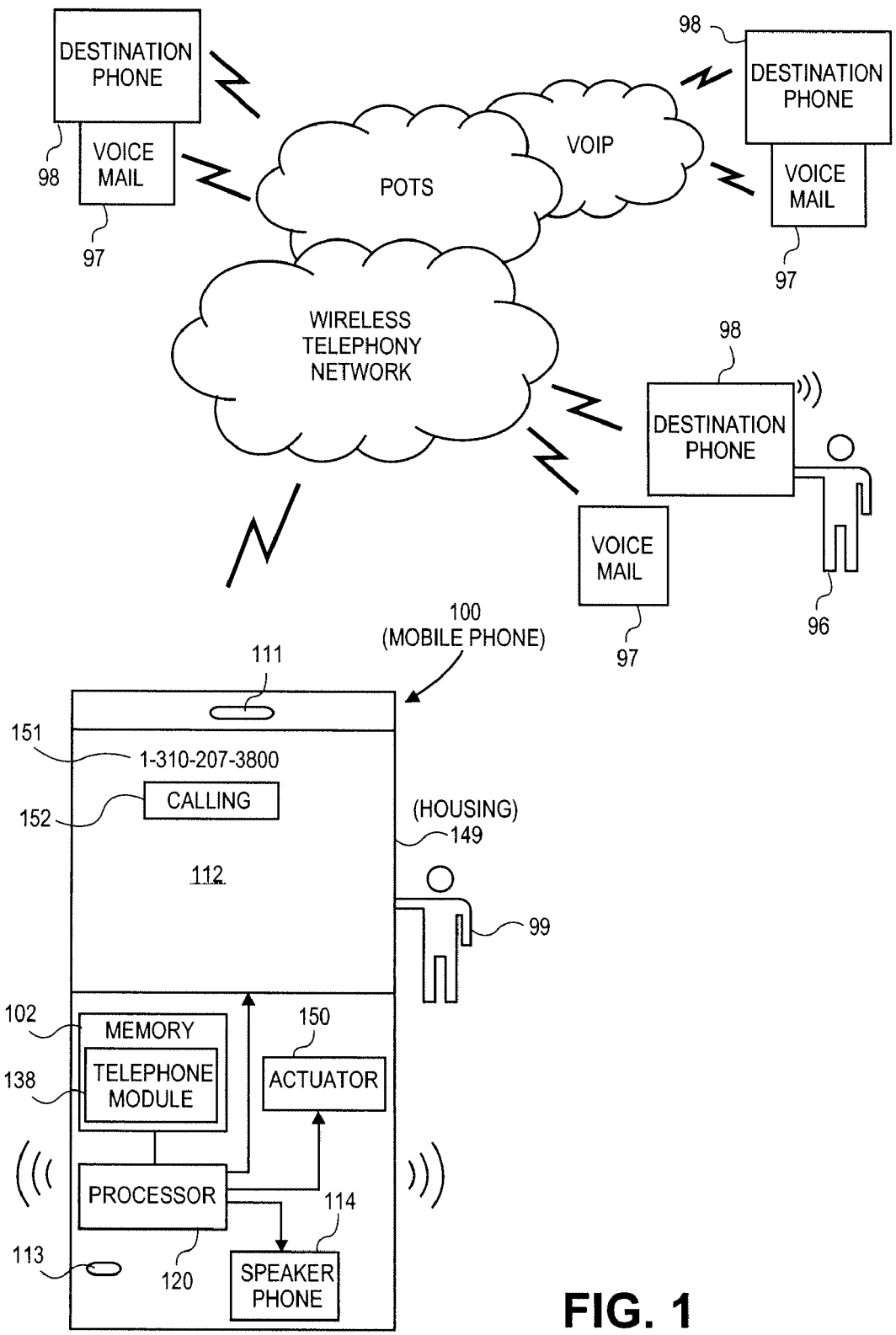
FIG. 1 is a block diagram of a mobile phone being operated during an outgoing phone call.

FIG. 1 is a block diagram of a mobile phone 100 performing a phone call with a destination phone 98 over a wireless telephony network. Communications between the mobile phone 100 and the wireless telephony network may be in accordance with known cellular telephone communication network protocols including, for example, global system for mobile communications, GSM, enhanced data rate for GSM evolution, EDGE, and worldwide interoperability for microwave access, WiMAX. The mobile phone 100 may also have a subscriber identity module, SIM, card, which is a detachable smart card that contains the subscription information of its user 99, and may also contain a contacts list of the user 99.

The mobile phone 100 is made of a housing 149 within which are integrated several components including a display screen 112, a receiver 111 (earpiece speaker), a microphone 113 (mouthpiece), a speakerphone 114, and an actuator 150. Additional circuitry, including a combination of hardware circuitry and software, are, of course, included to obtain the needed functionality described below. These are not described in detail as they would be readily apparent to those of ordinary skill in the art of mobile phone circuits and software. It is sufficient to appreciate that the mobile phone 100 includes a telephone module 138 which is responsible for coordinating various tasks during a call. These tasks involve at least the display screen 112, the actuator 150 and the speakerphone 114 as described below. The telephone module 138 may be one or more pieces of software or firmware that are stored within memory 102 in the mobile phone 100 and are executed by one or more processors 120 in the mobile phone 100, to coordinate tasks such as dialing a call, directing audio signals during the call (between the microphone and the called party and between the called party and the receiver or speakerphone), and ending the call. The mobile phone 100 may also be referred to as the source phone or source device as it is the one through which an outgoing call is initiated by its user or caller 99. The user or caller 99 may own the mobile phone 100 or may otherwise be its primary user. The mobile phone 100 may be assigned a unique address by a wireless telephony network operator, such as an eleven digit international telephone number or an Internet Protocol, IP, address.

Turning now to the destination phone 98, this device need not be a mobile device but instead may be a land-based device that is coupled to a telephony network through wires or cables. The destination phone 98 may also be identified with a unique address, such as a telephone number within the public switched telephone network. The destination phone 98 may also have an Internet protocol (IP) address if it performs calls through a voice over IP (VOIP) protocol. The destination phone 98 may thus be a cellular handset, a plain old telephone service, POTS, analog telephone, a VOIP telephone station, or a desktop or notebook computer running telephony software.

The destination phone 98 is associated with a voicemail system 97 that allows callers to leave voice messages for its user 96 (also referred to as the callee or called party here), when the user is not able to answer an incoming call to the destination phone 98. The voicemail system 97 may be one administered by a telephony network operator, and in particular, the operator that has assigned the destination phone 98 its telephone number or other telephony address.

Still referring to FIG. 1, the mobile phone 100 has an actuator 150 that vibrates the housing 149 to give a haptic or tactile alert to the caller 99, in accordance with an input signal. In accordance with conventional practice, the telephone module 138 may activate the input signal during an incoming call, to alert the user 99 about the incoming call. In accordance with an embodiment of the invention, the telephone module 138 also activates this input signal during the making of an outgoing call to the destination phone 98. In this manner, the mobile phone housing 149 will vibrate to alert the caller 99, while the destination phone 98 is ringing. An example timeline for operating the mobile phone 100 in this manner is shown in FIG. 2.

Referring to FIG. 2, operation may begin with the mobile phone 100 receiving a destination number, that is the number assigned to a destination phone 98 (202). This may be in the form of the user 99 inputting the phone number through a physical or virtual (touch screen) keypad (not shown) of the mobile phone 100. Alternatively, the user 99 may select the name of the callee 96, who is associated with that number, from an address book or contacts list stored in the memory 102. Next, a send or call command is received from the user 99, who is now viewed as a caller (204). Once again, a physical or virtual keypad button may be made available to the user, to initiate the send or call command.

Once the send or call command has been received by the telephone module 138, a period of time indicated in FIG. 2 as the time interval in which the call is "made" (making a call) begins. The next operation (while making the call) is for the mobile phone 100 to display and dial the destination number (206). This is depicted in FIG. 1, for example, by the graphic object 151 on the display screen 112 showing an eleven digit telephone number that is assigned to the destination phone 98 and that was received from the user 99. Note that a reference to the "destination number" being displayed on the screen 112 may also encompass displaying a code, name, or other identifier associated with the number. For example, instead of showing the digits of the number in the graphic object 151, the mobile phone 100 could instead, or in addition, display the name of the user 96 of the destination phone 98 (where this name may have been obtained from the previously stored address book of the caller 99). In addition, in this example, a further graphic object 152 is shown simultaneously, depicting the text "calling", giving a further indication that an outgoing call is in process.

During operation 206, the mobile phone 100 may transmit the destination phone number or other address to the wireless telephony network 97, and the latter then attempts to contact or signal the destination phone 98 to which the number is assigned. Eventually, this signaling makes its way through the wireless telephone network 97 and any other networks that are between the mobile phone 100 and the destination phone 98, and the latter is contacted such that the destination phone 98 starts to ring, to alert the user or callee 96 of an incoming call (208). Different types of ringing are used in, for example, different countries. Once the mobile phone 100 detects that the destination has been contacted, and the destination phone 98 is likely ringing, the mobile phone begins to vibrate (210). Referring back to FIG. 1, this vibration is produced by the actuator 150 in accordance with its input signal. The telephone module 138 activates this input signal during the making of the outgoing call, so that the housing 149 vibrates to alert the user 99, while the destination phone is ringing.

Returning to the timeline of FIG. 2, after a number of rings, the call is picked up or answered by either the callee 96 himself, or his voicemail system 97 (212). This marks the end of the "making the call" interval. Thereafter, the call continues with a conversation that occurs between the caller 99 and either the voicemail system 97 or the callee 96 (214). During the conversation 214, the caller 99 may either be leaving a voice message that is recorded by the voicemail system 97, or there may be a live two-way conversation with the callee 96 using the destination phone 98. Thereafter, the call is ended by either party hanging up the call or by the voicemail system disconnecting the call (216).

In one embodiment of the invention, the telephone module 138 in the mobile phone 100 deactivates the input signal to the actuator 150, to stop vibration of the housing in response to detecting that the making of the outgoing call has ended. This may occur when the outgoing call has been picked up or gone "off-hook" by the voicemail system 97 or by the callee 96, or if the caller 99 has hung up. In another scenario, the telephone module detects the end of the making of the outgoing call, when the destination phone 98 stops ringing.

In yet another embodiment, the telephone module 138 automatically enables the speakerphone 114 in response to the call being picked up (operation 212 in FIG. 2). Thus, the phone may stop vibrating at that point, and its speakerphone 114 is automatically enabled so that the caller 99 can carry on the conversation (214) in a hands-free manner or without having to hold the phone 100 against her ear.

In another embodiment, when the mobile phone 100 vibrates (operation 210), during the making of the call, the telephone module 138 activates the input signal to the actuator in a manner that modulates the vibration in accordance with an on/off cycle that is synchronized to that of a ring tone being received by the mobile phone 100. This provides the caller 99 with a more accurate feel for when the destination is imaging.

Turning now to FIG. 3, a call processing timeline for another embodiment of the invention is shown. This timeline may be essentially similar to that of FIG. 2, except for the fact that operation 210 has been replaced with operation 310. Now, once the destination has been contacted (208), the mobile phone 100 flashes its display screen backlight (310). Once again, this gives the caller 99 a more accurate feel for the destination ringing stage of an outgoing call process. In another embodiment, both the vibration (210) and the display screen flashing (310) features can be enabled, by the user 99 programming or configuring her call preferences in the phone, so that the user 99 as a caller obtains an even more prominent experience during the making of the call. This allows the caller 99 to, for example, hold the phone 100 in her hand in front of her or set it down on a table in a darkly lit room or at nighttime after having initiated the call, without having to worry about holding the phone 100 against her ear to hear the destination phone ringing. This capability may be implemented by the telephone module 138 (see FIG. 1) signaling the display screen to not only show a graphic indicative of the outgoing call (e.g., graphic object 151 and/or graphic object 152) but also activate the input signal for the backlight of the display screen, so that the backlight flashes the display screen while the destination phone is ringing. Similar to the vibration indication, the display screen may be flashed in sync with the ringing tone for the destination phone (which is being received by the mobile phone 100).

The telephone module 138 may deactivate the input signal to stop flashing the display screen, in response to detecting that the making of the outgoing call has ended. This may occur by detecting when the call has been picked up by the callee's voicemail system or by the callee himself, or that the caller has hung up (operation 212). In this embodiment, where the display screen is flashed during the making of the call, the mobile phone may also be configured to automatically enable the speakerphone 114 in response to the call being picked up (operation 212), prior to the conversation starting (214).

In a further embodiment, if the outgoing call is answered by either the callee or the callee's voicemail (operation 212), the telephone module may detect this event and in response can signal the display screen 112 to change its background color. Thus, for instance, the background color of the display screen may be red while no call has been initiated, yellow during the making of the call, and then green once the call has been picked up or answered. Other color combinations are possible.

Figure 4:
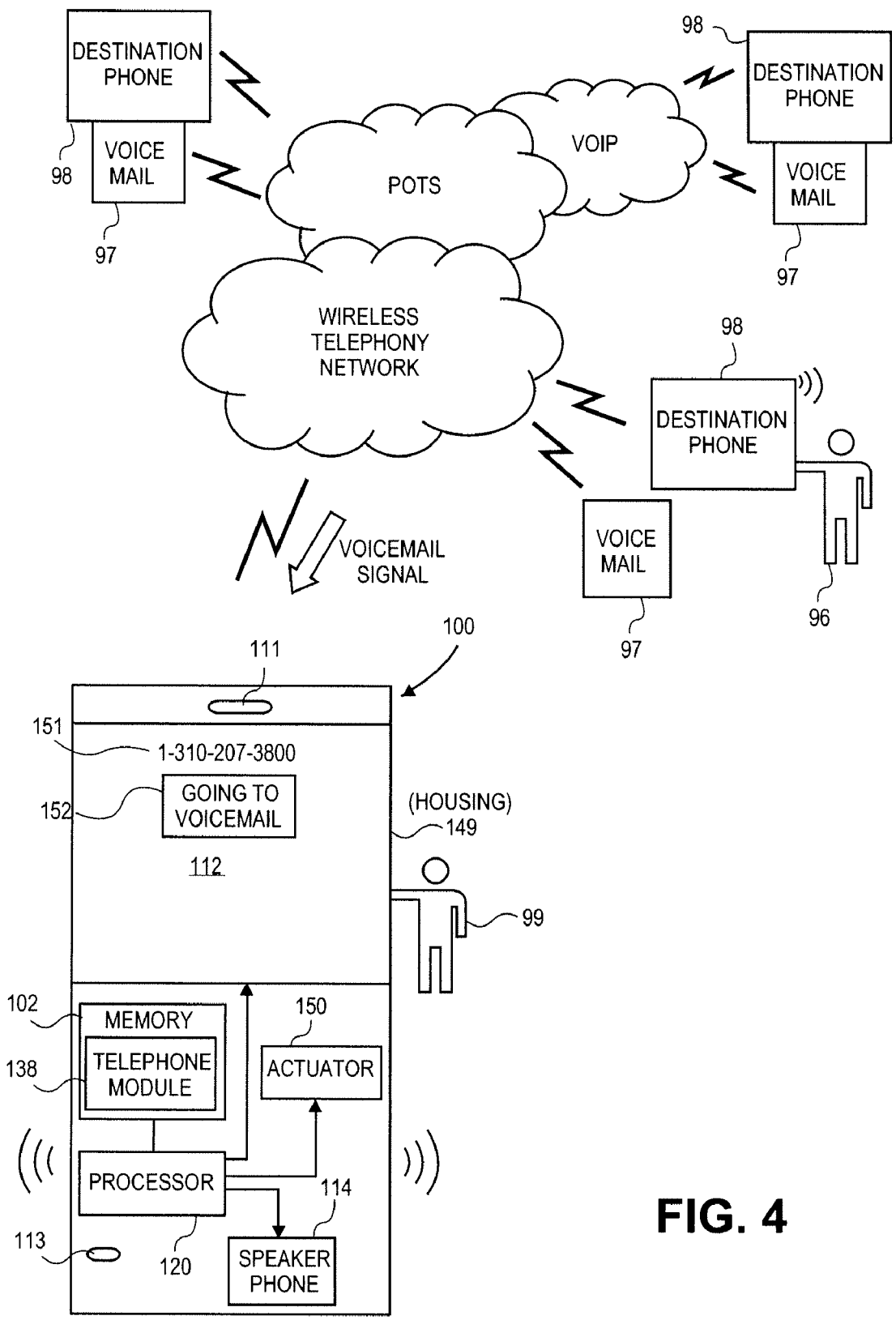
FIG. 4 is a block diagram of the mobile phone receiving a voicemail signal while processing an outgoing call.

Turning now to FIG. 4, a block diagram of the mobile phone 100 is shown receiving a voicemail signal while processing an outgoing call. This is another embodiment of the invention that allows the user 99 to make more efficient use of the outgoing call functionality in his mobile phone. The environment in FIG. 4 is essentially similar to that of FIG. 1, except that the graphic object 152 in the display screen 112, now alerts the caller 99 that the outgoing call being made has been sent to voicemail. This alert is given in response to the mobile phone 100 receiving a separate voicemail signal from the telephony network. A timeline of the events in an example of such an outgoing call process is shown in FIG. 5.

Figure 5:
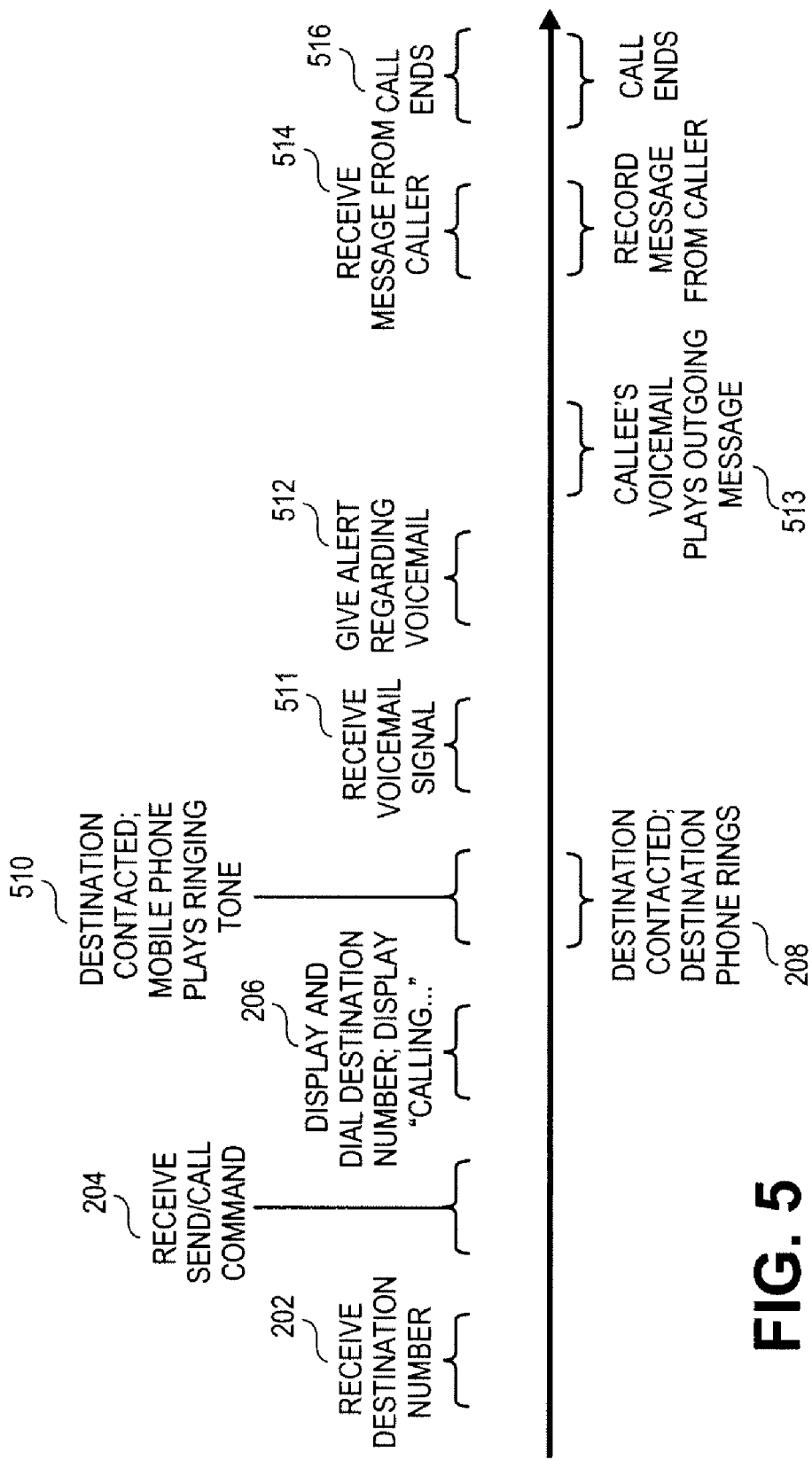
FIG. 5 is a timeline of events including the receiving of a separate voicemail signal by the mobile phone.

In FIG. 5, the outgoing call begins in a manner similar to those described above in connection with FIG. 2 and FIG. 3, namely that a destination number is received from the user 99 (operation 202), followed with a send or call command (operation 204). The telephony module 138 then signals the display screen to display the destination number and the text "calling". This time, once the destination has been contacted and the destination phone starts to ring to alert the called party (208), the mobile phone may start to play a similar ringing tone (operation 510). This may be played through the receiver 111 or, if enabled, through the speakerphone 114.

Next, once a decision has been made that the call is to be routed to the voicemail system 97, the telephony network sends a voicemail signal giving such an indication, to the mobile phone (operation 511). In response to this control signal, the mobile phone will give an alert to the user 99, that the outgoing call is now being routed to the callee's voicemail (operation 512). As seen in FIG. 4, this alert may be is a visual alert indicated by the appearance of appropriate text within the graphic object 152 shown on the display screen 112. At about the same time, the voicemail system 97 responds with playing the callee's outgoing message (operation 513). Thus, the voicemail signal sent by the telephony network in operation 511 precedes the playing of the outgoing message by the voicemail system 97. This control signal may be implemented, for example, using any known telephony signaling protocol, e.g. signaling system #7 (SS7), which is used to set up most public switched telephone network telephone calls. Such a control signal may be translated from SS7 to, for example, a GSM signaling protocol, as it makes its way through the wireless telephony network to the mobile phone 100. Alternatively, if a call to the destination phone 98 involves a VOIP call, then the voicemail control signal may have originated in a suitable packet network communications session protocol, such as the H.323 call signaling protocol.

The caller, upon receiving the voicemail alert (512) will immediately know that his call has been routed to voicemail. At that point, the caller may simply decide to hang up, without leaving a message. In this manner, the caller does not have to wait to hear the outgoing message. Indeed, many users do not wish to leave voicemail messages or do so infrequently, such that they would appreciate being alerted as soon as their outgoing call has been routed to voicemail, thereby making even more efficient use of their mobile phone. In such an embodiment, referring back to the timeline of FIG. 5, the call would end (516) immediately after the phone has given the user 99 the alert regarding voicemail (512). Thus, there would be in that case no message received from the caller (operation 514 would be absent). In a similar embodiment, the telephone module 138 may be programmed by the user 99 to automatically hang up whenever the voicemail signal is received, because in that case, the user does not wish to ever leave a voicemail message.

Figure 6:
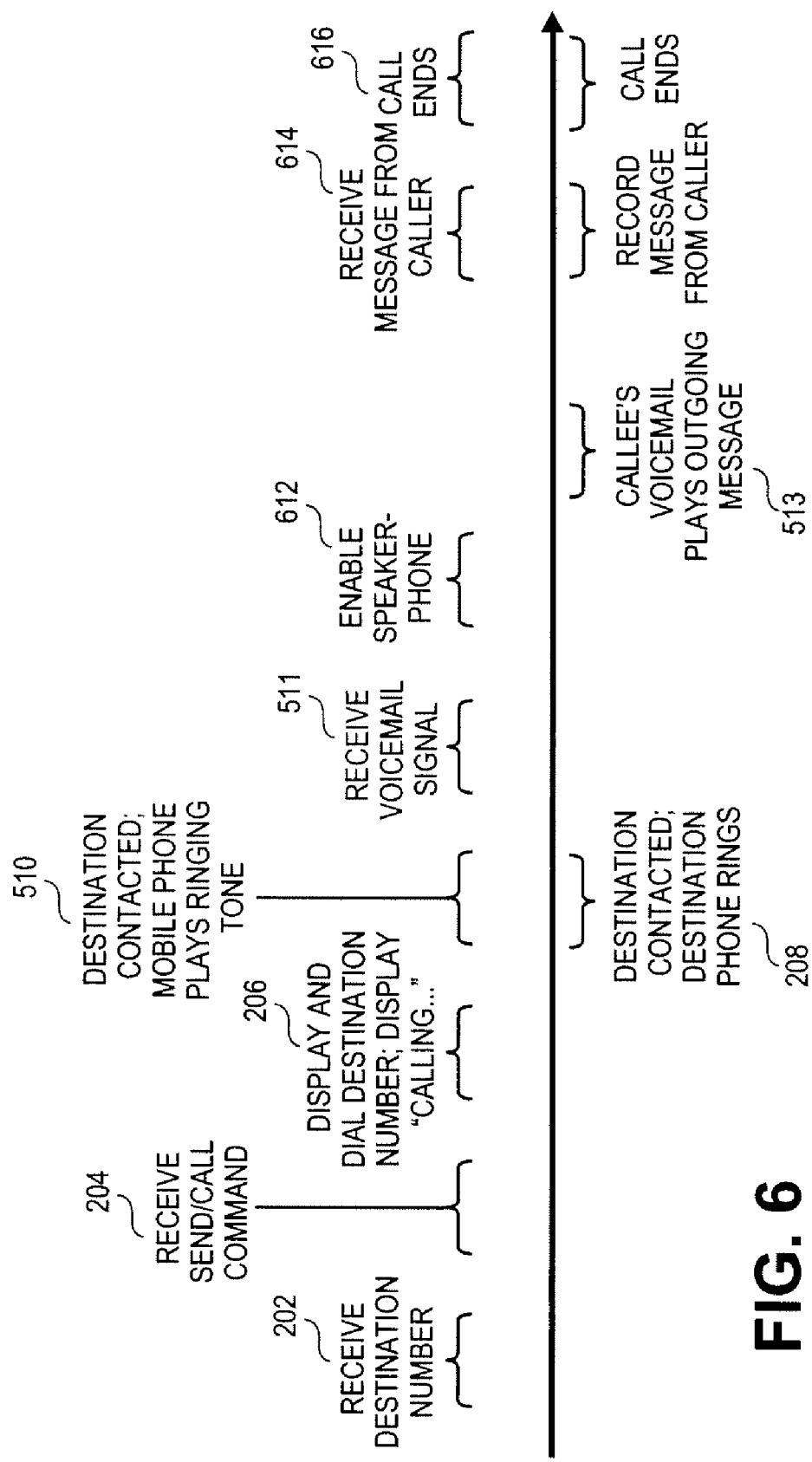
FIG. 6 is a timeline of events for processing a call, where speakerphone is automatically enabled.

Turning now to FIG. 6, a timeline of events in another embodiment of the invention is shown. In this case, the processing of the outgoing phone call by the mobile phone 100 starts in a manner similar to the calls described above, namely that the destination number is received (202), a send or call command is then received (204), and the destination number is dialed (206). The mobile phone may play a ringing tone when the destination has been contacted (510). Similar to the call described in FIG. 5, in this case the called party does not answer and the call is routed to the voicemail system. The telephone network generates a voicemail signal which is received by the mobile phone (511). In this embodiment, the mobile phone responds to the voicemail signal by automatically enabling the speakerphone 114 (operation 612). Next, the mobile phone receives and plays back the caller's outgoing message (513) through the speakerphone, followed by receiving a message from the caller (614) which is recorded by the destination phone 98. The call may then end (616) by the caller hanging up or by the voicemail system disconnecting. This feature of automatically enabling the speakerphone (in response to a separate voicemail signal) may be programmed by the caller, into the mobile phone, so that the telephone module responds automatically to the received voicemail signal and signals appropriate circuitry in the mobile phone to route the downlink voice path for the call to the speakerphone, rather than the receiver 111 (see FIG. 1).

In another embodiment of the invention, the telephone module can be programmed by the caller to automatically enable the speakerphone (operation 612 in FIG. 6), but after having alerted the caller that she has been routed to voicemail. Thus, there would be an instance of operation 512 (see FIG. 5) between operation 511 (receiving the voicemail signal) and operation 612 (enabling speakerphone), in the timeline of FIG. 6.

Figure 7:
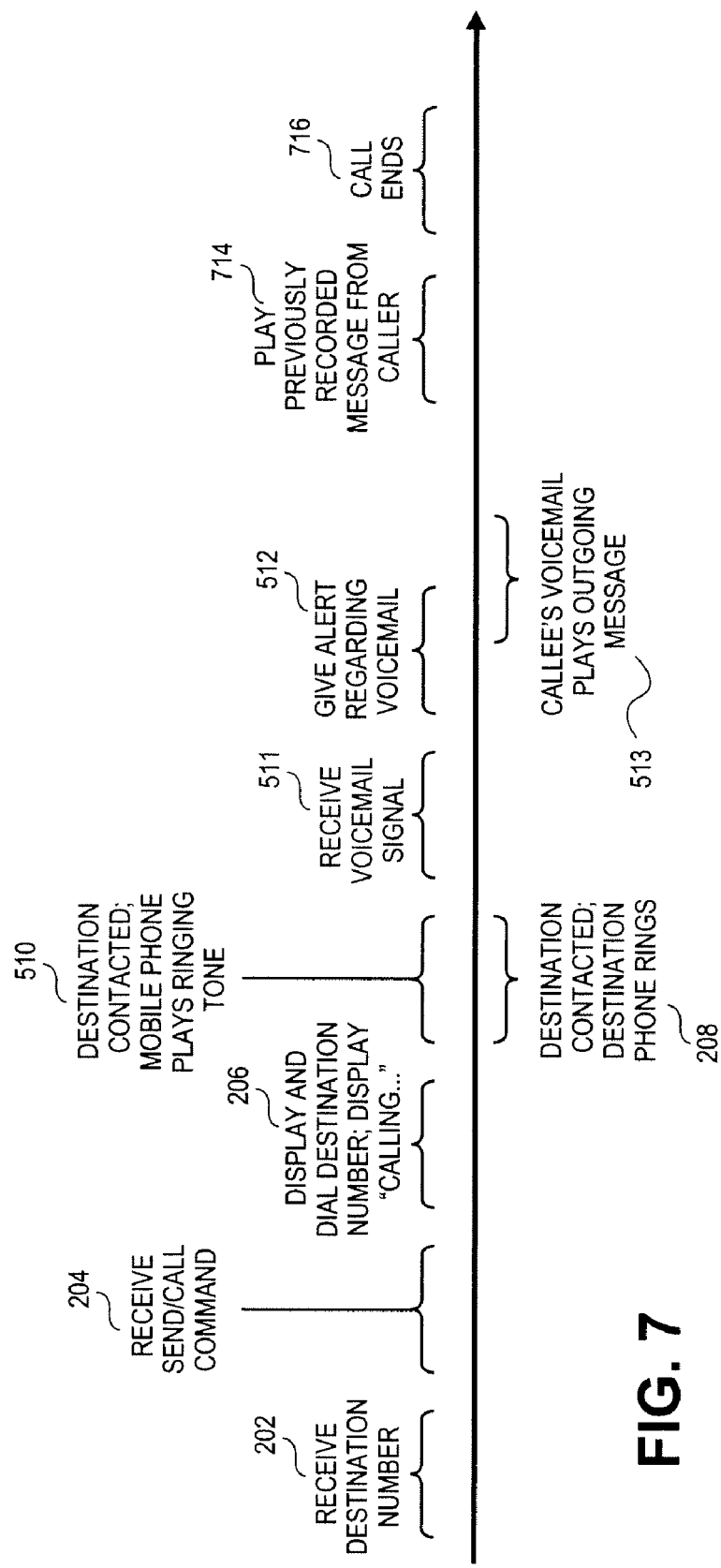
FIG. 7 shows a timeline of call processing events in which a previously recorded message from the caller is automatically played.

Turning now to FIG. 7, yet another scenario for the mobile phone to process an outgoing call is shown. In this case, the events proceed similar to the outgoing call processes described above in that a destination number is received (202), followed by a send or call command being received (204), and then the destination number is dialed (206). After the destination has been contacted, the mobile phone plays a ringing tone (510). In this case, there is no answer by the called party, such that the call is routed to voicemail, resulting in the mobile phone receiving a voicemail signal (511). In response, an alert is given to the caller regarding the call being routed to voicemail (512). At this point or shortly thereafter, the voicemail system has begun playing the callee's outgoing message (513). In this embodiment, the telephone module then waits for a voicemail tone, or other indication that the outgoing message has completed and that message recording has begun, and then automatically plays a previously recorded message from the caller (operation 714). The message may be a standard message or a custom message from the caller. For example, after the outgoing message has finished playing, the telephone module may play a short, pre-recorded sound clip such as "Hello, this is Michael Lee" which is then recorded by the voicemail system. After playing the sound clip, the telephony module hangs up the call and the call ends (operation 716).

Note that as an alternative to playing the pre-recorded message and then hanging up, the telephony module could be programmed by the user 99 to enable the speakerphone in response to detecting the voicemail signal, and following the giving of an alert to the caller. This allows the caller 99 to hear the outgoing message and then, if desired, the caller can speak a message that is then recorded by the voicemail system.

In general, the telephony module may be configured or programmed by the user to support one or more of the above-described outgoing call features.

To conclude, various ways of indicating an outgoing telephone call in a mobile phone have been described. These techniques render a more efficient outgoing call process for the caller, which may help reduce air time and power consumption by the mobile phone particularly when it is being used to make a large number of outgoing calls. As explained above, an embodiment of the invention may be a machine-readable medium (such as memory 102) having stored thereon instructions which program a processor to perform some of the operations described above. In other embodiments, some of these operations might be performed by specific hardware components that contain hardwired logic. Those operations might alternatively be performed by any combination of programmed data processing components and custom hardware components.

A machine-readable medium may include any mechanism for storing information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM).

The invention is not limited to the specific embodiments described above. Accordingly, other embodiments are within the scope of the claims.

What is claimed is:

1. A mobile phone comprising:
a mobile phone housing having integrated therein an actuator and a telephone module,
the actuator to vibrate the mobile phone housing to give a haptic or tactile alert to a user of the mobile phone, wherein the actuator is to vibrate in accordance with an input signal, and
the telephone module to activate the input signal during the making of an outgoing call to a destination phone, so that the mobile phone housing vibrates to alert the user while the destination phone is ringing, and to deactivate the input signal to stop vibration of the mobile phone housing in response to detecting that the making of the outgoing call has ended by the mobile phone.

2. The mobile phone of claim 1 wherein the telephone module is to activate the input signal in a manner that modulates vibration of the mobile phone housing in accordance with an on/off cycle that is synchronized to that of a ring tone being received by the mobile phone.

3. The mobile phone of claim 1 further comprising a speakerphone, wherein the telephone module is to automatically enable the speakerphone in response to the call being picked up.

4. The mobile phone of claim 1 wherein the telephone module is to detect end of the making of the outgoing call when the outgoing call has been picked up by a voicemail system or by a called party, or when the user of the mobile phone has hung up.

5. The mobile phone of claim 1 wherein the telephone module is to detect end of the making of the outgoing call when the destination phone stops ringing.

6. A method for operating a mobile phone comprising:
vibrating a mobile phone housing, to give a haptic or tactile alert to a user of the mobile phone, in accordance with an input signal; and
activating the input signal while making an outgoing call to a destination phone, so that the mobile phone housing vibrates to alert the user while a ring tone is being received by the mobile phone, and deactivating the input signal to stop vibration of the mobile phone housing in response to detecting that the making of the outgoing call has ended.

7. The method of claim 6 wherein said activating the input signal comprises:
modulating vibration of the mobile phone housing in accordance with an on/off cycle that is synchronized to ring tone being received by the mobile phone.

8. The method of claim 6 wherein said detecting that the making of the outgoing call has ended comprises:
detecting that the outgoing call has been picked up by a voicemail system or by a called party, or that the user of the mobile phone has hung up.

9. The mobile phone of claim 6 wherein said detecting that the making of the outgoing call has ended comprises:
detecting that the destination phone has stopped ringing.

* * * * *